United States Patent Office 3,419,405
Patented Dec. 31, 1968

3,419,405
STARCH COMPOSITION COMPRISING SOURING AGENTS AND SURFACTANTS
Robert M. Lang, Trenton, Mich., assignor to Wyandotte Chemicals Corporation, Wyandotte, Mich., a corporation of Michigan
No Drawing. Filed May 8, 1967, Ser. No. 636,647
9 Claims. (Cl. 106—211)

ABSTRACT OF THE DISCLOSURE

A starch composition having enhanced flowability, consistency and stability contains starch, souring agents and surfactants.

---

The present invention relates to an improved starch product. More particularly, the present invention relates to a starch product that is stable in solution over long periods of time. The starch product of this invention shows surprising flowability, consistency, and stability. The starch composition contains a combination of a wide range of ingredients performing a variety of functions in the laundry process, such as starching, souring, and fabric brightening.

Commercial laundry starch products are essentially fluid dispersions of cooked starch. Such a colloidal system containing only starch and water is relatively unstable and will separate, thicken, or gel often within a few hours. Cooling aggravates this condition; therefore, it is generally necessary to maintain the starch solution at an elevated temperature (for example, between 120° and 140° F.). Consequently, to be a suitable article of commerce, a laundry starch product must be protected with additives against the adverse effects of prolonged storage over a wide range of temperatures and conditions.

Starch is a very important item in the total supplies used in a laundry. The use of poor quality starch or the improper preparation of the starch may cause considerable trouble. Because of the great variety of materials to be starched, different methods employed, and the variation in plant conditions, preparation and use procedures should be in accordance with manufacturers' instructions. Variations in manufacturing processes produce many different types of starch, each suited to some special type of work. Heretofore the actual preparation of a starch solution was an individual proposition which was peculiar to each laundry.

Starch manufacturers usually provide rather detailed instructions on their best basic methods for using their products. Today, in the laundry industry, colloidal sizing or starching is generally the rule rather than the exception because there is little work that comes into the modern laundry that will not be improved by a sizing starch. Sizing increases flat abrasion, increases warp and filling tensile strength, and brings out the patterns like new, resulting in a fabric that looks, feels, and stands up better. Starching or sizing also lays the nap and lint, makes for better ironing, and in general provides the various benefits of starch treatment.

In the modern laundry facilities now being used, it has become necessary to prepare and store large quantities of starch solution. It has been found that many of the products now on the market are not capable of being stored as solutions in large quantities. For example, a laundry operator may make up a solution of starch in a quantity of about 100 gallons or more. The preparation of the starch solution takes considerable time and effort. The laundry operator finds that under today's volume demands, this quantity of starch does not last long enough. However, he is unable to correct this problem because of the limited types of starch products available. The operator has found that if he makes up large solutions, the solutions may gel or the starch granules may settle out of the solution if the temperature of the solution is not held fairly constant. Furthermore, these preparations may be decomposed by micro-organisms before the starch solution is used up. This results in uneven starching and other deleterious effects upon the textiles being starched.

The tendency of dissolved starch to precipitate from solution is explained by the phenomenon called "retrogradation." This phenomenon is observed in a cooked starch solution when it cools down. Starch polymers are heavily loaded with free hydroxyl groups. The hydroxyl groups in one molecule have a strong affinity for those in another molecule, especially if they can lie closely enough together. The different molecule configurations of the starch molecules line up parallel to each other like matches in a box. When this happens in a starch solution, the chains line up and the hydroxyl groups bind them fast together by hydrogen bonding causing the bundles of chains to precipitate. It is this aspect of retrogradation that the instant invention overcomes.

The starch composition of this invention will eliminate many of these problems. It has been found that this starch composition when made up into a liquid solution will maintain its useability over an extended period of time.

In general, the starch composition of this invention contains a starch, laundry souring agent, and a surfactant or mixtures of surfactants. Other ingredients may also be included in the compositions for special purposes. For example, compatible antimicrobial and germicidal agents may be included in the formulation. Optical brighteners may be used to impart a white fluorescence to the washed fabric and to enhance its appearance. A minute quantity of soda ash may be included in the formulation to neutralize the free acid in the sour. Dyes, such as a blue dye, may be included in the formulation to enhance the appearance of the finished composition and starch fabrics. Based on total weight of composition, the preferred composition contains from about 70 to 95 weight percent starch, from about 2 to 15 weight percent laundry sour, and from about 0.3 to 3 weight percent surface-active agents. On a pound basis, the compositions of the invention generally contain from about 14 to 56 grams of laundry souring agents and from about 2 to 10 grams of surfactants per pound of dry starch. However, it is to be understood, as illustrated in Example 3 infra, that the surfactant may comprise as much as 50% of the starch composition without departing from the scope of the invention. For economic considerations, it is preferred to use 10 grams or less of surfactant per pound of starch.

For the purposes of the instant invention, any type of pre-gelatinized starch may be used. Examples of such starches include those derived from corn, wheat, rice, grain sorghum, waxy grain sorghum, waxy maize, and tapioca or mixtures thereof, as well as water-dispersible modifications or derivatives thereof.

Although any of the above-mentioned starches may be used within the scope of this invention, it is preferred for economical reasons to use a pre-gelatinized corn starch. To prepare a pre-gelatinized corn starch, raw corn starch is treated by hydrolysis with acid. After subsequent cooking, the starch slurry is dried on steam-heated flaking roles. The finished pre-gelatinized corn starch is characterized as a loose, off-white granular product with a moisture content of approximately 10% maximum and exhibits a pH in a 1% aqueous solution of from about 6.0 to 7.5.

Generally, any of the sours used in the industry at the present time may be used in the compositions of this invention. The laundry sours are made from acetic acid, glycolic acid, oxalic acid, sodium acid fluoride, sodium silicofluoride, ammonium acid fluoride, ammonium silicofluoride, and mixtures thereof. Stock compositions of laundry sour may also be used. For example, solutions of ammonium silicofluoride or of ammonium silicofluoride pus a small amount of ammonium acid fluoride may be made up so as to contain about 80 pounds of sour per 100 gallons. Of this 80 pounds of sour, 10 to 20 pounds may be the ammonium acid fluoride.

The preferred laundry sour is a combination of ingredients. This combination of ingredients adds a number of important characteristics to the finished starch composition. The sour composition preferred is that composition claimed in U.S. Patent No. 3,193,505. The composition of the antimicrobial laundry sour consists essentially of a laundry sour selected from the group consisting of acetic acid, glycolic acid, oxalic acid, ammonium acid fluoride, ammonium silicofluoride, sodium acid fluoride, sodium silicofluoride, and zinc silicofluoride and a germicide. The germicide consists of a synergistic mixture of from about 58 to 93 weight percent of sodium pentachlorophenate and 42 to 7 weight percent of 3,4,4'-trichlorocarbanilide, based on total weight of the germicide.

The surfactant or surface-active agent used in the composition of the instant invention may be any nonionic or anionic surfactant or mixtures of surfactants that add stability, fluidity and penetration characteristics to the starch composition. Examples of the nonionic surface-active agents that may be used in the compositions of this invention include:

(1) The polyoxyethylene condensates of monoalkylated phenols represented by the formula (I) 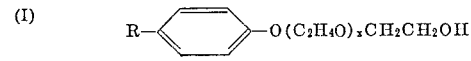

where R is an alkyl group containing from about 6 to 20 carbon atoms, and $x$ is an integer from about 5 to 30;

(2) Ethylene oxide adducts of straight-chain primary alcohols represented by the formula (II) $\quad R—O—(C_2H_4O)_xH$ where R—O— is the residue of a hydrophobic alcohol containing from 8 to 22 carbon atoms, and $x$ is an integer from 3 to 19 such that the ethylene oxide content is from 35 to 85 weight percent;

(3) Surface-active agents derived from straight-chain primary alcohols represented by the formula (III) $\quad R—O—(C_nH_{2n}O)_xH$ where R—O— is the residue of a hydrophobic alcohol containing 8 to 22 carbon atoms, $n$ is both 2 and 3 in a single molecule, and $x$ is an integer from about 3 to 19, indicating the total number of oxyalkylene radicals in the molecule;

(4) Surface-active agents represented by the formula (IV) 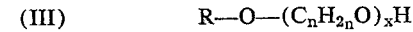

where $x$ and $y$ are integers such that the hydrophobic portion is a mixture of straight chains containing from 10 to 16 carbon atoms, and $z$ is from about 3 to 9;

(5) Conjugated polyoxyalkylene compounds as described in U.S. Patent No. 2,677,700 and which correspond to the formula (V) $\quad Y(C_3H_6O)_n(C_2H_4O)_mH$ where Y is the residue of an organic compound having from about 1 to 6 carbon atoms and one reactive hydrogen atom, $n$ has an average value of at least about 6.4 as determined by hydroxyl number, and $m$ has a value such that the oxyethylene portion constitutes from 10 to 90 weight percent of the molecule; and (6) Polyoxyalkylene compounds conforming to the generic formula (VI) $\quad Y(—P—E—H)_x$ where Y is the nucleus of an organic reactive hydrogen compound containing $x$ reactive hydrogen atoms and having up to 6 carbon atoms, $x$ is an integer, P is a hydrophobic polyoxyalkylene chain having an oxygen/carbon atom ratio of not more than 0.40, the molecular weight of P and the value of $x$ being such that the molecule, excluding E, has a molecular weight of at least about 400 to 900 and up to about 25,000, and E is a hydrophilic heteric polyoxyalkylene chain which (a) contains oxyethylene groups and at least 5% by weight of higher molecular weight oxyalkylene groups having at least 3 carbon atoms in their structure and (b) has an average oxygen/carbon atom ratio of greater than 0.40, E being present in the composition to the extent that it constitutes from 5 to 90 weight percent of the total composition. These compounds are more particularly described in U.S. Patent No. 3,101,374.

The surfactants represented by Formula III above are prepared (1) by reacting a mixture of ethylene oxide and propylene oxide, or (2) by sequentially reacting propylene oxide and then ethylene oxide, or (3) by sequentially reacting at least two mixtures of ethylene oxide and propylene oxide where each of the mixtures to be reacted contain different ethylene oxide to propylene oxide ratios, with a mixture of straight chain alcohols containing from about 8 to 22 carbon atoms, preferably 12 to 18 carbon atoms, in the aliphatic chain. Thus the surfactants represented by Formula III above may have either a heteric or a block structure depending upon the method of preparation. The surfactants having heteric structure will possess random distribution of oxyethylene and oxypropylene groups attached to the alcohol residue. The surfactants containing the block structure will contain an ordered arrangement of oxypropylene and oxyethylene groups attached to the alcohol residue. It is also to be understood that these surfactants may be cogeneric mixtures, that is, the surfactants are a series of closely related homologues obtained by condensing a plurality of oxide units with an alcohol or mixture of alcohols.

Anionic surface-active agents may also be used as the surfactant in the composition of this invention. Typical of such anionic surface-active agents are alkyl sulfonates, alkyl aryl sulfonates, amides of sulfosuccinic acid, alkyl esters of sulfosuccinic acid, alkylphenoxypolyethoxyethyl sulfates, fatty alcohol sulfates, and the like. Preferred anionic surface-active agents are those selected from (1) alkyl aryl sulfonates in which the alkaryl group contains from 12 to 20 carbon atoms, (2) fatty alcohol sulfates of the general structural formula (VII) $\quad CH_3(CH_2)_nOSO_3X$ in which $n$ is an integer from 7 to 17, and X is selected from hydrogen, sodium, potassium, magnesium and ammonium, (3) alkylphenoxypolyethoxyethyl sulfates of the general structural formula (VIII) 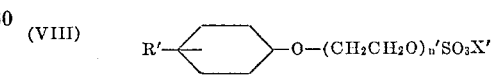

in which R' is an alkyl group containing from 8 to 10 carbon atoms, $n'$ is an integer from 2 to 5, and X' is selected from hydrogen, sodium, potassium, magnesium, and ammonium, and mixtures of these anionic surface-active agents.

Alkyl aryl sulfonates which may be used are those derived from benzene, naphthalene, diphenyl, and diphenylmethane, and include among others: sodium and potassium hexyl-, heptyl-, octyl-, nonyl-, decyl-, hendecyl-, dodecyl-, tridecyl-, and tetradecylbenzene sulfonate. The alkyl group may comprise either a straight or branched chain. A preferred alkyl aryl sulfonate comprises the sodium salt of an alkyl benzene sulfonate containing an average of 16 carbon atoms.

Suitable alkylphenoxypolyethoxyethyl sulfates include sodium and potassium octyl-, nonyl-, and decylphenyl-, di-, tri-, tetra-, and pentaethyleneglycol sulfate, and the like. The alkyl group of these compounds may comprise either a straight or branched chain. A preferred material is sodium ditertiarylbutylphenyldiethyleneglycol sulfate.

Among the anionic surface-active agents which have been found to be particularly useful in the process of this invention are the fatty alcohol sulfates, typical of which are sodium and potassium octyl-, nonyl-, decyl-, hendecyl-, dodecyl-, tridecyl-, tetradecyl-, pentadecyl-, hexadecyl-, heptadecyl-, and octadecylsulfate. Sodium lauryl sulfate is a preferred fatty alcohol sulfate for the purposes of this invention.

Suitable alkyl esters of sulfosuccinic acid (alkyl sulfoesters) may be represented by the formula (IX)        $R—COO—CH_2CH_2SO_3Na$ where R is an alkyl radical containing from about 10 to 20 carbon atoms. Examples of the alkyl sulfo-esters are oleic acid ester of sodium isethionate and coconut acid ester of sodium isethionate. These compounds are more particularly described in U.S. Patent No. 1,881,172.

Suitable amides of sulfosuccinic acids (alkyl sulfoamides) may be represented by the formula (X)
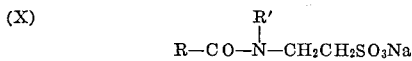

where R is an alkyl radical containing from 10 to 20 carbon atoms and R' is an alkyl radical containing from 1 to 6 carbon atoms. The preferred alkyl sulfo-amides are sodium N-methyl-N-tall oil acid taurate, sodium N-methyl-N-oleoyl taurate, sodium N-methyl-N-coconut oil acid taurate, and sodium N-methyl-N-palmitoyl taurate. These compounds are more particularly described in U.S. Patent No. 1,932,180.

The disclosures of the above-noted U.S. patents which more particularly describe certain of the surface-active agents that may be used in the instant invention, are incorporated by reference into the instant disclosure.

The preferred surface-active agent or surfactant for use in the instant invention comprises from about 25 to 75 parts by weight of a polyoxyethylene adduct of monoalkylphenol wherein the alkyl substituent has from about 6 to 15 carbon atoms and the oxyethylene content constitutes from about 25 to 55 weight percent of the molecule, and from about 25 to 75 parts by weight of a polyoxyethylene adduct of a polyalkylated phenol having at least two alkyl substituents of at least 6 carbon atoms each, the sum of the carbon atoms in the alkyl substituents being from at least about 14 to 24 and the oxyethylene content constituents from about 60 to 80 weight percent of the molecule.

The polyoxyethylene adducts of monoalkylphenol are represented by Formula I above. The polyoxyethylene adduct of a polyalkylated phenol may be represented by the formula (XI)
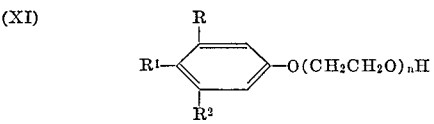

where R is hydrogen or an alkyl radical having from about 1 to 12 carbon atoms, $R^1$ and $R^2$ are alkyl radicals having from about 6 to 16 carbon atoms, and $n$ has a value from about 10 to 40. The preferred surfactant mixture is more fully discussed in Canadian Patent No. 698,560.

The compositions of this invention are made by merely blending the ingredients in a suitable mixer. The surface-active agents used in the compositions of the invention may be either in liquid or dry form. In using the liquid form of surfactant, thesurfactant is mixed with the dry starch and souring agent and is assimilated by the dry materials. In the solid form, the surfactant is merely blended with the starch and souring agent.

The following examples will more clearly illustrate the instant invention. However, the examples are not to be considered unduly limitative of the invention.

Description of materials used in the examples are identified as follows:

Surfactant Z is a mixture of surfactants consisting essentially of a mixture of about 40 parts by weight of a polyoxyethylene (6 moles of ethylene oxide) adduct of dodecylphenol and about 60 parts by weight of a polyoxyethylene (14 moles of ethylene oxide) adduct of dinonylphenol.

Surfactant Y is a polyoxyethylene adduct of monoalkylated phenol corresponding to Formula I above and having 10 to 15 ethenoxy units in the oxyethylene portion and about 9 carbons in the alkyl portion.

Surfactant X corresponds to Formula III above wherein R contains 12 to 18 carbon atoms and the ratio of ethylene oxide to propylene oxide is 3/1.

Surfactant W corresponds to Formula IV above wherein $z$ averages about 9, and $x+y$ is between 8 and 12.

Surfactant V corresponds to Formula IV above wherein $z$ averages about 3, and $x+y$ is between 8 and 12.

Surfactant U is a 3/1 mixture of surfactant W and surfactant X.

Surfactant T corresponds to Formula X above and is sodium-N-methyl-N-tall oil acid taurate.

Surfactant S corresponds to Formula VII above and is ammonium lauryl sulfate.

Surfactant R corresponds to Formula V above and has a polyoxypropylene hydrophobe base of 1,750 moleculor weight and contains 40 weight percent ethylene oxide.

Surfactant Q corresponds to Formula V above and has a polyoxypropylent hydrophobe base of 1,750 molecular weight and contains 80 weight percent ethylene oxide.

Sour No. 1 consists essentially of about 67 weight percent sodium silicofluoride, about 29 weight percent sodium pentachlorophenate, and about 4 weight percent 3,4,4'-trichlorocarbanilide.

Sour No. 2 consists essentially of about 98.9 weight percent sodium silicofluoride, with the balance a mixture of soda ash, optical brighteners, and dye.

Example 1

Four liquid starch mixes were made containing the following materials:

Starch A consists of one pound of pre-gelatinized corn starch and one gallon of water.

Starch B consists of one pound of pre-gelatinized starch, nine grams of surfactant Z, and one gallon of water.

Starch C consists of one pound of pre-gelatinized starch, 42.6 grams of Sour No. 1 and one gallon of water.

Starch D consists of one pound of pre-gelatinized starch, 42.6 grams of Sour No. 1, nine grams of surfactant Z and one gallon of water.

In each case, one gallon of water was added to a two-gallon container at about 100° F. An electrical mixer with a two-propeller shaft adjusted to just below the liquid surface was inserted at a 40° to 60° angle. The mixer was turned on to 400 r.p.m. and the ingredients were added in a surfactant, Sour No. 1, and pre-gelatinized starch order. Surfactant Z goes into the solution rapidly. Sour No. 1 was added slowly to the vortex of the swirling solution to allow dispersion. The pre-gelatinized corn starch was added slowly to the vortex of the solution to allow dispersion. After about one-half of the total of pre-gelatinized corn starch content was added, the mixer speed was increased to from about 700 to 750 r.p.m., and the rest of the starch was then added. As the additions were near completion, the mix becomes more viscous but is still fluid. The mixing time was approximately 15 minutes.

Fifteen hundred milliliter portions of each of the starch solutions were put into large test tubes, 1,500-milliliter capacity. Each of the large test tubes was equipped with sampling arms used in tube fittings near the bottom and top of the test tubes. Samples were removed from both the bottom and top of each tube at different time intervals to determine the solid contents with continued storage. Table I shows the results of these tests.

TABLE I.—EFFECT OF STORAGE ON TOTAL SOLIDS CONTENT

[Total solids, percent]

| Original | A 10.53% | | B 8.24% | | C 11.08% | | D 11.11% | |
|---|---|---|---|---|---|---|---|---|
| | AT [1] | AB [1] | BT | BB | CT | CB | DT | DB |
| 1 day | 10.46 | 10.45 | 10.23 | 9.75 | 11.03 | 11.03 | 11.05 | 11.04 |
| 2 days | 10.39 | 10.46 | 10.33 | 10.49 | 11.14 | 11.07 | 9.14 | 11.68 |
| 3 days | 10.61 | 10.50 | 10.77 | 10.48 | 11.13 | 11.17 | 11.50 | 11.29 |
| 4 days | 11.41 | 6.75 | 11.16 | 10.56 | | | | |
| 6 days | | | | | NF | 11.05 | 10.67 | 11.17 |
| 7 days | 8.74 | 9.79 | 10.59 | 10.20 | | | | |

[1] T—Top; B—bottom. AT—Starch slightly congealed at two days. AB—Starch rises in tube, water on bottom at three days. BT—Flows easily, slight odor at seven days. BB—Flows easily at seven days. CT—Flows slowly, top congealed at two days. CB—Flows easily at six days. DT—Flows easily at six days. (preferred composition) DB—Flows easily at six days (preferred composition). NF—No flow.

Example 2

About 400 milliliters of each starch solution as prepared in Example 1 was stored in containers.

The temperature of the starch solution was held at 30±1° F. for viscosity tests. Tests were made with a Brookfield Synchro-Lectric Viscometer. The results are shown in Table II.

TABLE II.—STARCH SOLUTIONS

| | Centipoise | | | |
|---|---|---|---|---|
| | A | B | C | D |
| Original | 986 | 332 | 1,036 | 362 |
| 1 day | 1,120 | 426 | 890 | 486 |
| 2 days | 1,438 | 508 | 1,026 | 532 |
| 3 days | 1,154 | 508 | 1,052 | 544 |
| 4 days | 1,078 | 604 | | |
| 6 days | | | 950 | 724 |
| 7 days | | 188 | | |

A—foaming and odor in sample at 4 days. B—light odor in sample at 4 days. C—no odor in sample after 6 days. D—no odor in sample after 6 days.

Example 3

This example illustrates that a wide range of the amounts of surface-active agents may be used in the starch formulation.

Ten Indian head muslin fabric swatches were cut to 8½ by 10 inches. They were washed with a strongly built soap-based detergent in one gallon of water at 110° to 120° F. for about 5 to 10 minutes and rinsed well. The swatches were placed in 100 milliliters of starch solution and run in a Launder-O-Meter for about 10 minutes while the system was held at 85° F. The water was squeezed out with the fingers, extracted for about 20 seconds, and pressed. The starch solution contained 0.808 gram of pre-gelatinized corn starch, 0.0756 gram of Sour No. 1, and the amount of surfactant as indicated in Table III.

To evaluate the stiffness, the starched swatches were cut into test strips ¾" wide by 5" long. The test strip was clamped between two metal blocks so that 3" of the test strip extended over the edge of the lower block. A horizontal line was drawn along the axis of the jaws of the metal blocks. At a point along the horizontal line 3" from the jaws, a 3" radius arc was drawn extending to a point 3" below the jaws. A vertical line drawn from the point 3" below the jaws upwards to the horizontal line was perpendicular to the horizontal line. The arc, the horizontal line, and the vertical line formed a quadrant of a circle. The arc was marked off in 100 equal parts. The test strips were allowed to remain in the clamped position at least ten seconds before the reading was taken, to assure an equilibrium position. At equilibrium, the test strip drooped over the upper edge of the lower block and the loose end of the test strip came to rest at a position on the arc. The reading on the arc was the measure of the stiffness; the higher the rating, the greater the stiffness. The stiffness values reported in Table III are the averages obtained on ten test strips at each surfactant concentration.

TABLE III

| Swatch No. | Surfactant in grams | Percent surfactant based on total active agents | Stiffness |
|---|---|---|---|
| 1 | 0.000 | 0.00 | 17.0 |
| 2 | 0.105 | 1.67 | 16.3 |
| 3 | 0.030 | 3.23 | 8.7 |
| 4 | 0.050 | 5.27 | 10.1 |
| 5 | 0.100 | 10.02 | 8.7 |
| 6 | 0.250 | 21.80 | 9.5 |
| 7 | 0.500 | 35.70 | 9.4 |
| 8 | 0.700 | 43.80 | 8.5 |
| 9 | 0.800 | 47.10 | 9.0 |
| 10 | 1.000 | 52.70 | 15.9 |

Examples 4–22

Examples 4–22 illustrate the use of several surfactants and two laundry souring agents in various starch formations. It is seen from the examples that a wide variety of anionic and nonionic surfactants may be used in the formulations.

EXAMPLES 4–14

| Components | 4 | 5 | 6 | 7 | 8 | 9 | 10 | 11 | 12 | 13 | 14 |
|---|---|---|---|---|---|---|---|---|---|---|---|
| Water, gal | 1 | 1 | 1 | ½ | ½ | ½ | ½ | ½ | ½ | ½ | ½ |
| Pre-gelatinized cornstarch, lbs | 1 | 1 | 1 | ½ | ½ | ½ | ½ | ½ | ½ | ½ | ½ |
| Sour No. 1, gm | 56 | | 56 | | | | | | | | |
| Sour No. 2, gm | | 56 | | 18 | 18 | 18 | 18 | 18 | 18 | 18 | 18 |
| Surfactant Z, gm | 9 | 9 | | | | | | | | | |
| Surfactant Y, gm | | | 9 | | | | | | | | |
| Surfactant X, gm | | | | 5 | | | 2.5 | | | | |
| Surfactant W, gm | | | | | 5 | | 2.5 | | | | |
| Surfactant Y, gm | | | | | | 5 | | | | | |
| Surfactant V, gm | | | | | | | | 5 | | | |
| Surfactant U, gm | | | | | | | | | 2 | 5 | 10 |

EXAMPLES 15–22

| Components | 15 | 16 | 17 | 18 | 19 | 20 | 21 | 22 |
|---|---|---|---|---|---|---|---|---|
| Water, gal | ½ | ½ | ½ | ½ | ½ | ½ | ½ | ½ |
| Pre-gelatinized corn starch, lbs | ½ | ½ | ½ | ½ | ½ | ½ | ½ | ½ |
| Sour No. 2, gm | 18 | 18 | 14 | 14 | 14 | 14 | 14 | 14 |
| Surfactant T, gm | 5 | | | | | | | |
| Surfactant S, gm | | 2 | | | | | | |
| Surfactant R, gm | | | 2 | 5 | 10 | | | |
| Surfactant Q, gm | | | | | | 2 | 5 | 10 |

What is claimed is:
1. A starch composition characterized by improved stability in solution, consisting essentially of from about 50 to 95 weight percent pregelatinized starch, from about 0.3 to 50 weight percent of a surfactant selected from anionic surface-active agents and nonionic surface-active agents, and from about 2 to 15 weight percent of a laundry souring agent selected from acetic acid, glycolic acid, oxalic acid, ammonium acid fluoride, ammonium silicofluoride, sodium acid fluoride, sodium silicofluoride and zinc silicofluoride.

2. The composition of claim 1 wherein the starch comprises from 70 to 95 weight percent and the surfactant comprises from about 0.3 to 10 weight percent and the laundry souring agent is selected from acetic acid, glycolic acid, oxalic acid, sodium-acid fluoride, sodium silicofluoride, ammonium acid fluoride, ammonium silicofluoride, and mixtures thereof.

3. The composition of claim 2 wherein the laundry souring agent is essentially sodium silicofluoride.

4. The composition of claim 2 wherein the laundry souring agent is an antimicrobial laundry sour composition consisting essentially of a laundry sour selected from acetic acid, glycolic acid, oxalic acid, ammonium acid fluoride, ammonium silicofluoride, sodium acid fluoride, sodium silicofluoride and zinc silicofluoride and a germicide, said germicide consisting of a synergistic mixture of 58 to 93 weight percent (based on the weight of said synergistic mixture) of sodium pentachlorophenate, and 42 to 7 weight percent (based on the weight of said synergistic mixture) of 3,4,4'-trichlorocarbanilide, said germicide being present in the amount of from 10 to 60 weight percent of the antimicrobial laundry sour composition.

5. The composition of claim 4 wherein the laundry sour composition consists essentially of about 67 weight percent sodium silicofluoride, about 29 weight percent sodium pentachlorophenate, and about 4 weight percent 3,4,4'-trichlorocarbanilide, the weight percentages being based on the weight of said laundry sour composition.

6. The composition of claim 2 wherein the surface-active agent is selected from
(A) compounds of the formula R—⟨phenyl⟩—O—$(C_2H_4O)_xCH_2CH_2OH$ where R is an alkyl group containing from about 6 to 20 carbon atoms and $x$ is an integer from about 5 to 30;
(B) compounds of the formula R—O—$(C_nH_{2n}O)_xH$ where R—O— is the residue of a hydrophobic alcohol containing from about 8 to 22 carbon atoms, $n$ is both 2 and 3 in a single molecule, and $x$ is an integer from about 3 to 19;
(C) compounds of the formula $CH_3(CH_2)_x$—CH—$(CH_2)_yCH_3$
                |
                O—$(CH_2CH_2O)_zH$ where $x$ and $y$ are integers such that the hydrophobic portion is a mixture of straight chains containing from 10 to 16 carbon atoms, and $z$ is from about 3 to 19;
(D) compounds of the formula $Y(C_3H_6O)_n(C_2H_4O)_mH$ where Y is the residue of an organic compound having from 1 to 6 carbon atoms and one reactive hydrogen atom, $n$ has an average value of at least about 6.4 as determined by hydroxyl number, and $m$ has a value such that the oxyethylene portion constitutes from 10 to 90 weight percent of the molecule;
(E) compounds of the formula $CH_3(CH_2)_nOSO_3X$ where $n$ is an integer from 7 to 17 and X is selected from hydrogen, sodium, potassium, magnesium and ammonium;
(F) compounds of the formula $$R—CO—\underset{\underset{R'}{|}}{N}—CH_2CH_2SO_3Na$$

where R is an alkyl radical containing from about 10 to 20 carbon atoms and R' is an alkyl radical containing from about 1 to 6 carbon atoms; and mixtures thereof.

7. The composition of claim 2 wherein the surfactant comprises from about 25 to 75 parts by weight of a polyoxyethylene adduct of monoalkylphenol wherein the alkyl substituent has from about 6 to 15 carbon atoms and the oxyethylene content constitutes from about 25 to 55 weight percent of the molecule, and from about 25 to 75 parts by weight of a polyoxyethylene adduct of a polyalkylated phenol having at least two alkyl substituents of at least 6 carbon atoms each, the sum of the carbon atoms in the alkyl substituents being from at least about 14 to 24 and the oxyethylene content constitutes from about 60 to 80 weight percent of the molecule.

8. A starch composition consisting essentially of from about 70 to 95 weight percent pre-gelatinized corn starch; from about 0 to 5 weight percent sodium pentachlorophenate; from about 0 to 5 weight percent 3,4,4'-trichlorocarbanilide; from about 5 to 10 weight percent sodium silicofluoride; from about 0.3 to 15 weight percent of a nonionic surface-active agent; the balance selected from dyes, optical brighteners, and mixtures thereof.

9. A starch solution consisting essentially of about one pound pre-gelatinized corn starch; about one gallon of water; from about 14 to 56 grams of a laundry sour selected from acetic acid, glycolic acid, oxalic acid, sodium acid fluoride, sodium silicofluoride, ammonium acid fluoride, ammonium silicofluoride, and mixtures thereof; and from about 2 to 10 grams of a surfactant selected from nonionic and anionic surface-active agents.

References Cited
UNITED STATES PATENTS

| | | | |
|---|---|---|---|
| 1,998,819 | 4/1935 | Phair | 252—136 X |
| 2,893,818 | 7/1959 | Millsaps et al. | 8—77 |
| 2,938,809 | 5/1960 | Katzbeck | 106—210 |
| 3,193,505 | 7/1965 | Blomfield | 252—136 |

JULIUS FROME, *Primary Examiner.*

T. MORRIS, *Assistant Examiner.*

U.S. Cl. X.R.

106—213; 117—138.5; 127—33; 117—165